United States Patent
Kim et al.

(10) Patent No.: US 10,851,220 B2
(45) Date of Patent: Dec. 1, 2020

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Seok Ho Jeong, Daejeon (KR); Yun Ki Cho, Daejeon (KR); Jeong Ju Moon, Daejeon (KR); Joo Ho Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/625,229

(22) PCT Filed: Dec. 4, 2018

(86) PCT No.: PCT/KR2018/015248
§ 371 (c)(1),
(2) Date: Dec. 20, 2019

(87) PCT Pub. No.: WO2019/112293
PCT Pub. Date: Jun. 13, 2019

(65) Prior Publication Data
US 2020/0190282 A1  Jun. 18, 2020

(30) Foreign Application Priority Data
Dec. 4, 2017 (KR) .................... 10-2017-0165272

(51) Int. Cl.
| C08K 5/00 | (2006.01) |
| C08K 5/10 | (2006.01) |
| C08L 23/08 | (2006.01) |
| C08L 23/12 | (2006.01) |
| C08L 25/06 | (2006.01) |
| C08L 27/06 | (2006.01) |
| C08L 31/04 | (2006.01) |
| C08L 75/04 | (2006.01) |

(52) U.S. Cl.
CPC ............. C08K 5/0016 (2013.01); C08K 5/10 (2013.01); C08L 23/08 (2013.01); C08L 23/12 (2013.01); C08L 25/06 (2013.01); C08L 27/06 (2013.01); C08L 31/04 (2013.01); C08L 75/04 (2013.01); *C08L 2203/16* (2013.01); *C08L 2203/202* (2013.01)

(58) Field of Classification Search
CPC ........ C08K 5/12; C08K 5/101; C08K 5/0016; C08K 5/10; C07C 69/704; C07C 69/78; C07C 69/82; C08L 23/06; C08L 23/08; C08L 23/12; C08L 25/06; C08L 27/06; C08L 31/04; C08L 75/04
See application file for complete search history.

(56) References Cited

U.S. PATENT DOCUMENTS

| 5,990,214 A | 11/1999 | Arendt et al. |
| 2003/0023112 A1 | 1/2003 | Lang et al. |
| 2003/0181556 A1 | 9/2003 | Lay et al. |
| 2006/0229394 A1 | 10/2006 | Kim et al. |
| 2007/0027240 A1 | 2/2007 | Lee et al. |
| 2013/0189527 A1 | 7/2013 | Meise et al. |
| 2013/0344632 A1 | 12/2013 | Becker et al. |
| 2014/0275376 A1* | 9/2014 | Arendt ................. C08K 5/0016 524/285 |
| 2014/0336320 A1* | 11/2014 | Lee .......................... C07C 67/03 524/296 |
| 2015/0112008 A1 | 4/2015 | Palil et al. |
| 2016/0280884 A1 | 9/2016 | Evans et al. |
| 2018/0237613 A1 | 8/2018 | Kim et al. |
| 2018/0237614 A1 | 8/2018 | Kim et al. |

FOREIGN PATENT DOCUMENTS

| KR | 10-2001-0022070 A | 3/2001 |
| KR | 10-2005-0026178 A | 3/2005 |
| KR | 10-0567903 B1 | 4/2006 |
| KR | 10-0676303 B1 | 1/2007 |
| KR | 10-2013-0012000 A | 1/2013 |
| KR | 10-2016-0134521 A | 11/2016 |
| KR | 10-2017-0130292 A | 11/2017 |
| WO | 2012-128875 A1 | 9/2012 |
| WO | 2015-126391 A1 | 8/2015 |

* cited by examiner

*Primary Examiner* — John E Uselding
(74) *Attorney, Agent, or Firm* — Dentons US LLP

(57) ABSTRACT

A plasticizer composition and a resin composition including the same. The plasticizer composition includes a terephthalate-based material including a mixture of dibutyl terephthalate, butyl(2-ethylhexyl) terephthalate and di(2-ethylhexyl) terephthalate; and a triethylene glycol diester-based material including a mixture of triethylene glycol bis(2-ethylhexanoate), (2-ethylhexanoyloxy) triethylene glycol benzoate and triethylene glycol dibenzoate. A material prepared from the resin composition has excellent mechanical properties, such as tensile strength, elongation rate, modulus, transmittance, transparency and plasticization efficiency.

7 Claims, No Drawings

PLASTICIZER COMPOSITION AND RESIN COMPOSITION INCLUDING THE SAME

CROSS-REFERENCE TO RELATED APPLICATIONS

This application is the U.S. national stage of international Application No. PCT/KR2018/015248, filed on Dec. 4, 2018, and claims the benefit of priority based on Korean Patent Application No. 10-2017-0165272, filed on Dec. 4, 2017, the entire contents of which are incorporated herein by reference.

TECHNICAL FIELD

The present invention relates to a plasticizer composition and a resin composition including the same.

BACKGROUND

Generally, plasticizers form corresponding esters by the reaction of alcohols with polycarboxylic acids such as phthalic acid and adipic acid. In addition, considering the internal and external regulations on harmful phthalate-based plasticizers to the human body, studies are continuing on plasticizer compositions which may replace phthalate-based plasticizers such as terephthalate-based, adipate-based and other polymer-based plasticizers.

Generally, plasticizers are used as raw materials of diverse products including wirings, pipes, flooring materials, wall papers, sheets, artificial leathers, tarpaulins, tapes and food wrapping materials by imparting various processing properties by appropriately adding diverse additives such as a filler, a stabilizer, a pigment, and an anti-fogging agent with a resin such as polyvinyl chloride (PVC) by processing methods including extrusion molding, injection molding and calendaring.

Recently, according to the plasticizer market situation, due to environmental issues on phthalate plasticizers, the development of eco-friendly plasticizers is competitively conducted in the art, and recently, the development of novel products to overcome the quality inferiority including the plasticization efficiency and migration of di(2-ethylhexyl) terephthalate (DEHTP) which is a widely used product among eco-friendly plasticizers, is being conducted.

Accordingly, studies on technique for developing better products than di(2-ethylhexyl)terephthalate or novel composition products including di(2-ethylhexyl)terephthalate to optimally apply as plasticizers for vinyl chloride-based resins, are required.

SUMMARY

The present invention provides a plasticizer which may be applied in a plasticizer composition, which may keep mechanical properties such as tensile strength, elongation rate and modulus to excellent degrees, and have excellent transmittance and transparency and improved plasticization efficiency, and a resin composition including the same.

To solve the tasks, there is provided in an embodiment of the present invention, a plasticizer composition including a terephthalate-based material including dibutyl terephthalate, butyl(2-ethylhexyl) terephthalate and di(2-ethylhexyl) terephthalate; and a triethylene glycol diester-based material including triethylene glycol bis(2-ethylhexanoate), (2-ethylhexanoyloxy) triethylene glycol benzoate and triethylene glycol dibenzoate.

In order to solve the tasks, there is provided in an embodiment of the present invention, a resin composition including 100 parts by weight of a resin; and 5 to 150 parts by weight of the plasticizer composition.

The plasticizer composition according to an embodiment of the present invention may keep excellent mechanical properties such as tensile strength, elongation rate and modulus, and may provide a plasticizer having excellent transmittance, transparency and plasticization efficiency.

DETAILED DESCRIPTION

Hereinafter, the present invention will be explained in detail to assist the understanding of the present invention.

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

The term "butyl" used in the description may mean a commonly called n-butyl, and may mean "isobutyl". Hereinafter, the term butyl is not limited to n-butyl but may be used as a term referring to both n-butyl and isobutyl.

Plasticizer Composition

According to an embodiment of the present invention, there is provided a mixture plasticizer composition including three kinds of terephthalate-based materials and three kinds of triethylene glycol diester-based materials. Particularly, the terephthalate-based material is characterized in including dibutyl terephthalate, butyl(2-ethylhexyl) terephthalate and di(2-ethylhexyl) terephthalate, and the triethylene glycol diester-based material is characterized in including triethylene glycol bis(2-ethylhexanoate), (2-ethylhexanoyloxy) triethylene glycol benzoate and triethylene glycol dibenzoate.

The three kinds of the terephthalate-based materials have excellent transmittance or transparency and excellent mechanical properties, and may be advantageously applied to products contacting foods or products contacting the human body, but have defects of having relatively inferior plasticization efficiency. In addition, a process step is added due to the manufacturing process and the unit cost of a product may be somewhat increased, and this process needs improvement.

Meanwhile, the triethylene glycol diester-based material is a typical eco-friendly material and has excellent plasticization efficiency, but has somewhat poor transparency and transmittance, which may act as fatal defects in products making contact with foods and products making contact with the human body, and the mechanical properties thereof are significantly inferior.

The plasticizer composition according to an embodiment of the present invention is a plasticization composition which may solve the above-mentioned defects, and uses materials such as the triethylene glycol diester-based material having no environmental issues as a mixture, thereby markedly improving plasticization efficiency and keeping the mechanical properties, transmittance and transparency to equivalent or better degrees.

The weight ratio of the terephthalate-based material and the triethylene glycol diester-based material included in the plasticizer composition may be 90:10 to 10:90, where the upper limit thereof may be 90:10, 85:15, 80:20, 70:30 or 60:40 and the lower limit thereof may be 10:90, 15:85, 20:80, 30:70 or 40:60. Preferably, the weight ratio may be 90:10 to 20:80, more preferably, 90:10 to 30:70, the most preferably, 90:10 to 50:50.

If such weight ratio is satisfied, specific physical properties may be kept to excellent levels of each compound as described above and the specific physical properties may be further improved.

The terephthalate-based material is a material in which a diester group is bonded to para positions of a benzene ring, where a 2-ethylhexyl group and a butyl group are bonded to the diester group, and is a mixture of compounds in which two butyl groups, a 2-ethylhexyl group and a butyl group, or two 2-ethylhexyl groups are bonded.

of triethylene glycol and benzoic acid, and 2-ethylhexanonic acid. Accordingly, each of Ra and Rb may be a benzoic acid derived hydrocarbon group or a 2-ethylhexanonic acid derived hydrocarbon group and three kinds of the compounds may be; a compound where both Ra and Rb are benzoic acid derived hydrocarbon groups, a compound where both Ra and Rb are 2-ethylhexanoic acid derived hydrocarbon groups, and a compound where Ra and Rb are a 2-ethylhexanoic acid derived hydrocarbon group and a benzoic acid derived hydrocarbon group.

Particularly, three kinds of the compounds included in the triethylene glycol diester-based materials may be the following Formulae A-1 to A-3:

[Formula A-1]

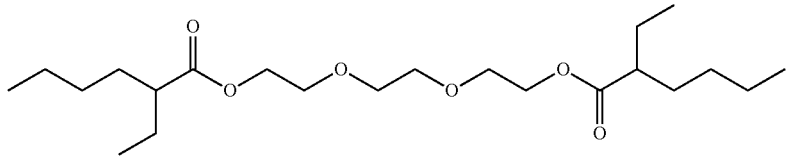

[Formula A-2]

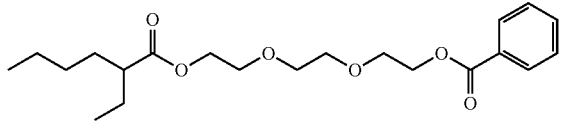

[Formula A-3]

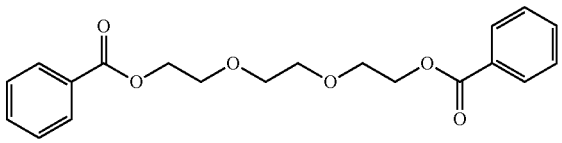

The composition of the three compounds may preferably be 0.5 to 50 wt % of the dibutyl terephthalate; 3.0 to 70 wt % of the butyl(2-ethylhexyl) terephthalate; and 0.5 to 85 wt % of the di(2-ethylhexyl) terephthalate, and the weight ratio may be controlled by adjusting the injection amounts of raw materials during performing reaction. Further, more preferably, the composition of the three compounds may be 0.5 wt % to 50 wt %, 10 wt % to 50 wt %, and 35 wt % to 80 wt %.

In addition, the triethylene glycol diester-based material may be a mixture of three kinds of the compound represented by the following Formula A:

[Formula 1A]

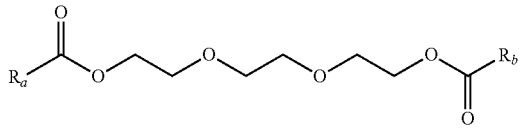

in Formula A, Ra and Rb are each independently

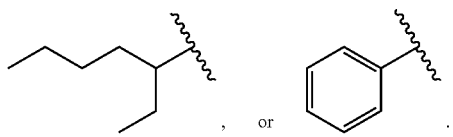

The triethylene glycol diester-based material may be generally a mixture of compounds produced by esterification The composition of the three compounds of the triethylene glycol diester-based material may include 0.5 to 85 wt % of the triethylene glycol bis(2-ethylhexanoate); 3.0 to 70 wt % of the (2-ethylhexanoyloxy) triethylene glycol benzoate; and 0.5 to 50 wt % of the triethylene glycol dibenzoate. Further, more preferably, the amounts may be 20 wt % to 70 wt %, 20 wt % to 70 wt %, and 1 wt % to 40 wt %.

In case of mixing the mixed terephthalate of three kinds as the terephthalate-based material and the mixed triethylene glycol diester of three kinds as the triethylene glycol diester-based material, and using the mixture as a plasticizer, excellent properties of each material may be taken and improving effects of plasticization efficiency may be achieved. If the mixing weight ratio of the materials are controlled to the above-mentioned ratio, the improving effect of physical properties may be optimized.

The plasticizer composition according to another embodiment of the present invention is characterized in including a terephthalate-based material including dibutyl terephthalate, butyl(2-ethylhexyl) terephthalate, di(2-ethylhexyl) terephthalate and terephthalate represented by the following formula 1; and a triethylene glycol diester-based material including triethylene glycol bis(2-ethylhexanoate), (2-ethylhexanoyloxy) triethylene glycol benzoate and triethylene glycol dibenzoate, and, based on 100 parts by weight of a mixture weight of the di(2-ethylhexyl) terephthalate and the terephthalate represented by the following Formula 1, the di(2-ethylhexyl) terephthalate is 99.0 parts by weight or more, and the terephthalate represented by the following Formula 1 is less than 1.0 part by weight:

[Formula 1]

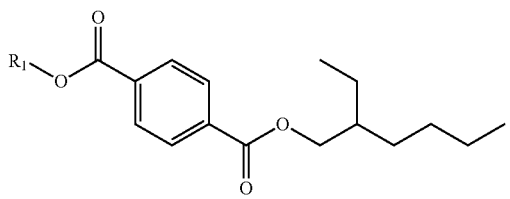

in Formula 1, R1 is a linear or branched alkyl group having 1 to 13 carbon atoms, where R1 is not a 2-ethylhexyl group.

Based on 100 parts by weight of the mixture weight of the di(2-ethylhexyl) terephthalate and the terephthalate represented by Formula 1, the di(2-ethylhexyl) terephthalate may be 99.0 parts by weight or more, and the terephthalate represented by the following Formula 1 may be less than 1.0 part by weight, preferably, 99.2 parts by weight or more and less than 0.8 parts by weight, respectively, more preferably, 99.5 parts by weight or more and less than 0.5 parts by weight, respectively, optimally, 99.9 parts by weight or more and less than 0.1 parts by weight, or 99.95 parts by weight or more and less than 0.05 parts by weight.

Preparation Method

A method for preparing the plasticizer composition in the present invention may be a blending method, and the plasticizer composition may be prepared by preparing each of the terephthalate-based material and the triethylene glycol diester-based material, and then mixing.

The terephthalate-based material may be prepared by direct esterification of terephthalic acid and two kinds of alcohols, or by the transesterification of di(2-ethylhexyl) terephthalate and butyl alcohol.

In the direct esterification, the alcohol may be 2-ethylhexyl alcohol and butanol, and the mixture alcohol thereof may be applied to the direct esterification.

The direct esterification may be prepared by a step of injecting terephthalic acid to an alcohol, adding a catalyst and reacting under a nitrogen atmosphere; a step of removing unreacted alcohol and neutralizing unreacted acid; and a step of dehydrating by distillation in a reduced pressure and filtering.

In addition, the alcohol may be used in a range of 150 to 500 mol %, 200 to 400 mol %, 200 to 350 mol %, 250 to 400 mol %, or 270 to 330 mol % based on 100 mol % of the terephthalic acid.

Meanwhile, the catalyst of the esterification may be, for example, at least one selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, and an organometal such as natural/synthetic zeolites, cation and anion exchange resins, and tetraalkyl titanate and the polymer thereof. In a particular embodiment, the catalyst may use tetraalkyl titanate.

The amount used of the catalyst may be different according to the kind thereof, and for example, a homogeneous catalyst may be used in an amount of 0.01 to 5 wt %, 0.01 to 3 wt %, 1 to 5 wt % or 2 to 4 wt % based on total 100 wt % of reactants, and a nonhomogeneous catalyst may be used in an amount of 5 to 200 wt %, 5 to 100 wt %, 20 to 200 wt %, or 20 to 150 wt % based on total 100 wt % of reactants.

In this case, the reaction temperature may be within a range of 180 to 280° C., 200 to 250° C., or 210 to 230° C.

In addition, the terephthalate-based material may be prepared by performing transesterification. In case of the transesterification reaction, di(2-ethylhexyl)terephthalate and butyl alcohol may react.

Meanwhile, "transesterification" used in the present invention means the reaction of an alcohol and an ester as shown in Reaction 1 below to interchange R" of the ester with R' of the alcohol as shown in Reaction 1 below.

[Reaction 1]

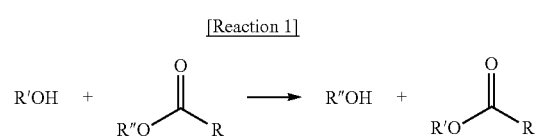

According to an embodiment of the present invention, if the transesterification is carried out, three kinds of ester compositions may be produced according to three cases: a case where the alkoxide of the alcohol attacks the carbon of two ester groups (RCOOR") which are present in the ester-based compound; a case where the alkoxide of the alcohol attacks the carbon of one ester group (RCOOR") which is present in the ester-based compound; and a unreacted case, in which no reaction is performed.

In addition, the transesterification has advantages of not generating waste water problem when compared with the esterification between acid-alcohol, being performed without a catalyst and solving defects occurring when using an acid catalyst.

The composition ratio of the terephthalate-based material which is prepared through the transesterification is the same as described above, and this composition ratio of the mixture may be controlled according to the addition amount of the alcohol.

The amount added of the alcohol may be 0.1 to 89.9 parts by weight, particularly, 3 to 50 parts by weight, more particularly, 5 to 40 parts by weight based on 100 parts by weight of the terephthalate compound.

In regard of the terephthalate, since the mole fraction of the terephthalate compound which participates in the transesterification may increase according to the increase of the amount added of the alcohol, the amounts of two terephthalate compounds which are products in the mixture may increase. Correspondingly, the amount of the terephthalate compound which is present in an unreacted state, tends to decrease.

According to an embodiment of the present invention, the molar ratio of the reactants, terephthalate and alcohol may be, for example, 1:0.005 to 5.0, 1:0.05 to 2.5, or 1:0.1 to 1.0, and within this range, and an ester-based plasticizer composition having high processing efficiency and excellent processability improving effect may be obtained.

The composition ratio may be the ratio of a mixture composition obtained by the esterification, and may be a desired composition ratio by further mixing a specific compound. The mixture composition ratio may be appropriately controlled so as to achieve desired physical properties. However, the mixture composition ratio of the three kinds of the terephthalate-based materials is not limited to the range. The composition ratio may be changed by additionally injecting any one among the three kinds of the terephthalate, and available mixing composition ratio is the same as described above.

According to an embodiment of the present invention, the transesterification may be performed at 120 to 190° C., preferably, 135 to 180° C., more preferably, 141 to 179° C. for 10 minutes to 10 hours, preferably, 30 minutes to 8 hours, more preferably, 1 to 6 hours. Within the temperature and time ranges, a mixture which is a terephthalate-based material having a desired composition ratio may be effectively obtained. In this case, the reaction time may be calculated from a point when the reaction temperature is attained after elevating the temperature of the reactants.

The transesterification may be performed under an acid catalyst or a metal catalyst, and in this case, the effects of decreasing reaction time may be achieved.

The acid catalyst may include, for example, sulfuric acid, methanesulfonic acid or p-toluenesulfonic acid, and the metal catalyst may include, for example, an organometal catalyst, a metal oxide catalyst, a metal salt catalyst, or a metal itself.

The metal component may be, for example, any one selected from the group consisting of tin, titanium and zirconium, or a mixture of two or more thereof.

The direct esterification and the transesterification may be used for preparing the triethylene glycol diester-based material described above. That is, particular reaction conditions, molar ratio, etc. may be similar.

However, the triethylene glycol diester-based material may be generally prepared by transesterification and may be prepared using benzoic acid, 2-ethylhexanoic acid, and triethylene glycol as raw materials. The triethylene glycol diester-based material may have difference in using not a dicarboxylic acid as the terephthalate-based material but a dialcohol.

The method for preparing the triethylene glycol diester-based material is not specifically limited and there is no limitation in the preparation method thereof only if the mixed material of three kinds of triethylene glycol diesters may be provided.

The terephthalate-based material and the triethylene glycol diester-based material thus prepared may be blended by a common method, and the blending method is not specifically limited.

Resin Composition

According to another embodiment of the present invention, the plasticizer composition may be included in an amount of 5 to 150 parts by weight, 10 to 100 parts by weight, or 30 to 60 parts by weight and 70 to 130 parts by weight according to the use applied, based on 100 parts by weight of a resin including ethylene vinyl acetate, polyethylene, polyketone, polypropylene, polyvinyl chloride, polystyrene, polyurethane, thermoplastic elastomer, or a mixture thereof.

The resin composition may be processed through various methods such as plastisol processing, extrusion or injection processing, and calendaring processing, and may be applied to cables, car interior materials, films, sheets, tubes, wall papers, toys, flooring materials, wirings or coating materials of optical fibers.

In addition, the resin composition may include products designed for utilizing in a medical or food industry, for example, blood bags, intravenous injection bags, saline bags, intravenous injection tubes, stomach tubes, catheter tubes, drainage tubes, medical gloves, oxygen masks, correction-support apparatuses, artificial skins and food wrapping materials (for example, wrapping materials for various beverages, meats and frozen vegetables).

Preferably, the resin composition may be applied to an eco-friendly resin for wrapping foods or medical resins and may be evaluated to have excellent functionalities including transparency and color so as to be applied to the resins, and may show excellent adhesion and similar or better basic mechanical properties such as plasticization efficiency and volatile loss as the conventional plasticizer.

To the resin composition, a stabilizer, an anti-fogging agent, etc. may be additionally added, and other additives may be further added.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Preparation Example 1: Preparation of Terephthalate-Based Material

To a reactor equipped with a stirrer, a condenser and a decanter, 2000 g of di(2-ethylhexyl) terephthalate (LG Chem) and 340 g of n-butanol (17 parts by weight based on 100 parts by weight of DEHTP) were injected, and transesterification was carried out under a nitrogen atmosphere at a reaction temperature of 160° C. for 2 hours to obtain a composition including dibutyl terephthalate (DBTP), butyl (2-ethylhexyl) terephthalate (BEHTP) and di(2-ethylhexyl) terephthalate (DEHTP) in amounts of 4.0 wt %, 35.0 wt % and 61.0 wt %, respectively.

The reaction product was distilled to remove butanol and 2-ethylhexyl alcohol to finally prepare a mixture composition.

Preparation Example 2: Preparation of Triethylene Glycol Diester-Based Material

To a reactor equipped with a stirrer, a condenser and a decanter, 450.5 g of triethylene glycol, 778.7 g of 2-ethylhexanoic acid, 293.0 g of benzoic acid and 2.0 g of tetra-normalbutyl titanate as a catalyst were injected, the temperature was elevated to 220° C. under a nitrogen atmosphere, and esterification was carried out for 10 hours. Then, through a purification process, a composition including triethylene glycol bis(2-ethylhexanoate), (2-ethylhexanoyloxy) triethylene glycol benzoate and triethylene glycol dibenzoate in amounts of 42.4 wt %, 45.4 wt % and 12.2 wt %, respectively, was obtained.

The materials prepared in Preparation Examples 1 and 2 were mixed to prepare plasticizer compositions of the examples, and the particulars are summarized in Table 1 below. The evaluation of the physical properties of the plasticizer compositions was performed according to the test items below.

TABLE 1

|  | Material of Preparation Example 1 | Material of Preparation Example 2 |
|---|---|---|
| Example 1 | 90 | 10 |
| Example 2 | 70 | 30 |
| Example 3 | 50 | 50 |
| Example 4 | 30 | 70 |
| Example 5 | 10 | 90 |
| Comparative Example 1 | 100 | 0 |
| Comparative Example 2 | 0 | 100 |

<Test Items>

Hardness Measurement

Shore (Shore A and D) hardness at 25° C., 3T 10 s was measured according to ASTM D2240. The lower the value was, the better.

Tensile Strength Measurement

By ASTM D638 method, a specimen was drawn in a cross-head speed of 100 mm/min (0.25 T) using a test apparatus of U.T.M (manufacturer: Instron, model name: 4466), and a point where the specimen was cut was measured. The tensile strength was measured in a TD direction and a MD direction and was calculated as follows. The higher the value was, the better.

Tensile strength (kgf/mm$^2$)=load value (kgf)/thickness (mm)×width (mm)

Elongation Rate Measurement

By ASTM D638 method, a specimen was drawn in a cross-head speed of 100 mm/min (0.25 T) using a test apparatus of U.T.M, and a point where the specimen was cut was measured. The elongation rate was measured in a TD direction and a MD direction and was calculated as follows. The higher the value was, the better.

Elongation rate (%)=[length after elongation/initial length]×100

Migration Loss Measurement

According to KSM-3156, a specimen (1 T) with a thickness of 2 mm or more was obtained, PS plates were attached onto both sides of the specimen and a load of 1 kgf/cm$^2$ was applied. The specimen was stood in a hot air circulation type oven (80° C.) for 72 hours and then taken out and cooled at room temperature for 4 hours. Then, the PS plates attached onto both sides of the specimen were removed, the weights before and after standing in the oven were measured, and the migration loss was calculated as follows.

The lower the value was, the better.

Migration loss (%)=[(initial weight of specimen at room temperature−weight of specimen after standing in oven)/initial weight of specimen at room temperature]×100

Volatile Loss Measurement

The specimen manufactured was processed at 80° C. for 72 hours, the weight of the specimen was measured, and calculation was conducted as follows. The lower the value was, the better.

Volatile loss (%)=[(initial weight of specimen−weight of specimen after processing)/initial weight of specimen]×100

100% Modulus Measurement

By ASTM D638 method, a specimen was drawn in a cross-head speed of 100 mm/min (0.25 T) using a test apparatus of U.T.M, and the elongation stress (100% modulus) when elongated by 100% was measured in a TD direction and a MD direction. The lower the value was, the better.

Haze and Transparency Measurement

By using NDH 7000 Haze meter, haze and transparency were measured. The lower the haze value was, the better, and the higher the transparency value was, the better.

Adhesion and Unwinding Ability Measurement

By direct hand contact, the degree of adhesion was evaluated by 5 scales, where 1 was considered excellent and 5 was considered inferior, and the degree of unwinding ability was evaluated by 5 scales, where 1 was considered excellent and 5 was considered inferior.

Experimental Example 1: Evaluation of Physical Properties of Resin Specimen

A specimen was manufactured using each of the mixture plasticizer compositions of the Examples and the Comparative Examples as listed in Table 1.

Each specimen was manufactured referring to ASTM D638. With respect to 100 parts by weight of a polyvinyl chloride resin (PVC (LS100), 40 parts by weight of each plasticizer composition prepared in the Examples and the Comparative Examples, 10 parts by weight of epoxidized soybean oil (ESO), 1.5 parts by weight of LTX-630P as a stabilizer, and 2 parts by weight of Almax-9280 as an anti-fogging agent were blended and mixed in 700 rpm at 98° C. by using a roll mill, working was conducted at 160° C. for 4 minutes and processing using a press was conducted at 180° C. for 2.5 minutes (low pressure) and 2 minutes (high pressure) to manufacture a specimen.

Using each specimen, the test items were evaluated and the results are listed in Table 2 below.

TABLE 2

|  |  | Example 1 | Example 2 | Example 3 | Example 4 | Example 5 | Comparative Example 1 | Comparative Example 2 |
|---|---|---|---|---|---|---|---|---|
| Hardness | Shore A | 81.5 | 81.3 | 81.1 | 80.6 | 80.3 | 83.0 | 80.3 |
|  | Shore D | 36.2 | 36.2 | 36.1 | 36.1 | 36.0 | 37.3 | 36.0 |
| Tensile strength (kg/cm$^2$) | TD | 211.5 | 210.3 | 208.9 | 206.8 | 207.0 | 210.0 | 198.2 |
|  | MD | 230.1 | 223.8 | 222.7 | 226.8 | 227.7 | 228.7 | 210.5 |
| Elongation rate (%) | TD | 295.0 | 292.4 | 293.0 | 294.5 | 291.2 | 293.2 | 280.4 |
|  | MD | 292.1 | 290.3 | 287.9 | 284.6 | 285.9 | 294.0 | 267.4 |
| 100% Modulus | TD | 92.0 | 91.7 | 91.7 | 91.3 | 91.3 | 94.0 | 91.0 |
|  | MD | 98.8 | 98.8 | 98.5 | 98.5 | 98.5 | 101.1 | 94.9 |

TABLE 2-continued

|  | Example 1 | Example 2 | Example 3 | Example 4 | Example 5 | Comparative Example 1 | Comparative Example 2 |
|---|---|---|---|---|---|---|---|
| Migration loss (%) | 1.37 | 1.35 | 1.42 | 1.43 | 1.48 | 1.33 | 1.78 |
| Volatile loss (%) | 1.88 | 2.10 | 2.14 | 2.38 | 2.64 | 1.90 | 3.71 |
| Haze (%) | 3.21 | 3.20 | 3.26 | 3.44 | 3.58 | 3.18 | 5.21 |
| Transparency (%) | 91.0 | 90.2 | 89.9 | 90.7 | 89.5 | 91.1 | 86.2 |
| Adhesion | 2 | 2 | 1 | 1 | 1 | 4 | 1 |
| Unwinding ability | 3 | 2 | 2 | 2 | 2 | 5 | 2 |

Referring to Table 2, the hardness values of Examples 1 to 4 were evaluated to be an equivalent degree to the excellent hardness value of the triethylene glycol diester-based material of Comparative Example 2 and thus, the plasticization efficiency was found to be taken from better side properties. When comparing mechanical properties including tensile strength, elongation rate and modulus values of the Examples with Comparative Example 1, the values were equivalent degrees, and thus, the mechanical properties were found to be taken from better side properties. In addition, the migration loss and the volatile loss of the Examples were equivalent to Comparative Example 1 which had a lower value, and it was found that excellent values were shown. The haze value and transparency were also found to be equivalent degrees to the values of a better one.

Particularly, with respect to the tensile strength and elongation rate, though the triethylene glycol diester-based material which had inferior tensile strength and elongation rate was mixed, a case where the triethylene glycol diester-based material was mixed with the terephthalate-based material showed improved values when compared with a case using the terephthalate-based material alone.

In addition, if the plasticizer compositions of Examples 1 to 5 were wrap processed and the adhesion and unwinding ability of a film were evaluated, it was found that the inferior properties of the terephthalate-based material of Comparative Example 1 were improved overall.

That is, as the effects anticipated from the mixing of two materials, linear change of the physical properties of each material was not shown, but excellent physical properties of each material were kept to the same or better degrees and some properties were even further improved.

Through this, it may be found that if a terephthalate-based material and a triethylene glycol diester-based material are mixed, excellent physical properties of each material may be kept to the same or better degrees and mechanical properties may show even further improved values. Accordingly, the plasticizer composition according to the present invention has excellent plasticization efficiency and improved mechanical properties, and may provide a resin which has excellent volatile loss, migration loss, haze and transparency.

Although the preferred embodiments of the present invention have been described in detail, it is understood that the present invention should not be limited to these embodiments but various changes and modifications can be made by one ordinary skilled in the art within the spirit and scope of the present invention as hereinafter claimed.

The invention claimed is:

1. A plasticizer composition, comprising:
a terephthalate-based material comprising a mixture of dibutyl terephthalate, butyl(2-ethylhexyl) terephthalate and di(2-ethylhexyl) terephthalate; and
a triethylene glycol diester-based material comprising a mixture of triethylene glycol bis(2-ethylhexanoate), (2-ethylhexanoyloxy) triethylene glycol benzoate and triethylene glycol dibenzoate, and
wherein a weight ratio of the terephthalate-based material and the triethylene glycol diester-based material is 90:10 to 10:90.

2. The plasticizer composition according to claim 1, wherein the terephthalate-based material comprises 0.5 to 30 wt % of the dibutyl terephthalate; 10 to 50 wt % of the butyl(2-ethylhexyl) terephthalate; and 40 to 89 wt % of the di(2-ethylhexyl) terephthalate.

3. The plasticizer composition according to claim 1, wherein the triethylene glycol diester-based material comprises 0.5 to 85 wt % of the triethylene glycol bis(2-ethylhexanoate); 3.0 to 70 wt % of the (2-ethylhexanoyloxy) triethylene glycol benzoate; and 0.5 to 50 wt % of the triethylene glycol dibenzoate.

4. A plasticizer composition, comprising:
a terephthalate-based material comprising a mixture of dibutyl terephthalate, butyl(2-ethylhexyl) terephthalate, di(2-ethylhexyl) terephthalate, and a terephthalate represented by the following Formula 1; and
a triethylene glycol diester-based material comprising a mixture of triethylene glycol bis(2-ethylhexanoate), (2-ethylhexanoyloxy) triethylene glycol benzoate and triethylene glycol dibenzoate,
wherein, based on 100 parts by weight of a mixture of the di(2-ethylhexyl) terephthalate and the terephthalate represented by the following Formula 1, the di(2-ethylhexyl) terephthalate is 99.0 parts by weight or more, and the terephthalate represented by the following Formula 1 is less than 1.0 part by weight:

[Formula 1]

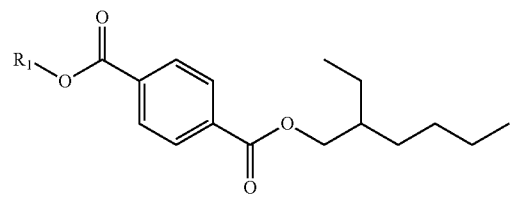

wherein in Formula 1, R1 is a linear or branched alkyl group of 1 to 13 carbon atoms, with the proviso that R1 is not a 2-ethylhexyl group, and
wherein a weight ratio of the terephthalate-based material and the triethylene glycol diester-based material is 90:10 to 10:90.

5. A resin composition comprising 100 parts by weight of a resin; and 5 to 150 parts by weight of the plasticizer composition according to claim 1.

6. The resin composition according to claim 5, wherein the resin is at least one selected from the group consisting of ethylene vinyl acetate, polyethylene, polypropylene, polyketone, polyvinyl chloride, polystyrene, polyurethane and thermoplastic elastomer.

7. A product comprising the resin composition according to claim 5, wherein the product is selected from the group consisting of cables, flooring materials, car interior materials, films, sheets, wall papers, and tubes.

\* \* \* \* \*